US008447456B2

(12) United States Patent
Wang et al.

(10) Patent No.: US 8,447,456 B2
(45) Date of Patent: May 21, 2013

(54) DETECTION OF ENGINE INTAKE MANIFOLD AIR-LEAKS

(75) Inventors: Wenbo Wang, Novi, MI (US); Kurt D. McLain, Clarkston, MI (US)

(73) Assignee: GM Global Technology Operations LLC

( * ) Notice: Subject to any disclaimer, the term of this patent is extended or adjusted under 35 U.S.C. 154(b) by 1204 days.

(21) Appl. No.: 12/015,750

(22) Filed: Jan. 17, 2008

(65) Prior Publication Data

US 2009/0187301 A1 Jul. 23, 2009

(51) Int. Cl.
*G06F 11/30* (2006.01)

(52) U.S. Cl.
USPC ....... 701/29.1; 701/30.9; 701/31.1; 701/31.7; 701/31.8; 701/31.9

(58) Field of Classification Search
None
See application file for complete search history.

(56) References Cited

U.S. PATENT DOCUMENTS

| | | | | |
|---|---|---|---|---|
| 4,589,279 | A * | 5/1986 | Mitsuyasu et al. | 73/114.35 |
| 5,546,295 | A * | 8/1996 | Prete et al. | 363/17 |
| 5,606,311 | A * | 2/1997 | Polidan et al. | 340/607 |
| 5,656,765 | A * | 8/1997 | Gray | 73/23.32 |
| 6,067,965 | A * | 5/2000 | Trumpy et al. | 123/480 |
| 6,148,616 | A * | 11/2000 | Yoshida et al. | 60/605.2 |
| 6,427,527 | B1 * | 8/2002 | Langer | 73/114.72 |
| 6,568,246 | B1 * | 5/2003 | Ponagai et al. | 73/40.5 R |
| 6,611,740 | B2 * | 8/2003 | Lowrey et al. | 701/29.4 |
| 6,684,869 | B2 * | 2/2004 | Ponagai et al. | 123/680 |
| 6,941,936 | B2 * | 9/2005 | Yasui et al. | 123/674 |
| 6,957,140 | B1 * | 10/2005 | Bauerle et al. | 701/110 |
| 7,444,234 | B2 * | 10/2008 | Bauerle | 701/114 |
| 2002/0096158 | A1 * | 7/2002 | Murakami et al. | 123/690 |
| 2002/0101747 | A1 * | 8/2002 | Falk et al. | 363/71 |
| 2003/0070667 | A1 * | 4/2003 | Yasui et al. | 123/674 |
| 2003/0131833 | A1 * | 7/2003 | Ponagai et al. | 123/680 |
| 2004/0187846 | A1 * | 9/2004 | Hoshino et al. | 123/399 |
| 2004/0210379 | A1 * | 10/2004 | Kirschke et al. | 701/114 |
| 2006/0207579 | A1 * | 9/2006 | Tsuda et al. | 123/568.16 |
| 2008/0173010 | A1 * | 7/2008 | Suresh et al. | 60/287 |
| 2008/0183366 | A1 * | 7/2008 | Bauerle | 701/103 |
| 2009/0187301 | A1 * | 7/2009 | Wang et al. | 701/29 |
| 2010/0020576 | A1 * | 1/2010 | Falk | 363/55 |

* cited by examiner

*Primary Examiner* — Khoi Tran
*Assistant Examiner* — Jonathan L Sample

(57) ABSTRACT

A method of determining an engine intake air leak may include measuring an air flow rate into an internal combustion engine, comparing the measured air flow rate to a first predetermined air flow limit, calculating an estimated air flow rate into the engine when the measured air flow rate is less than the first predetermined air flow limit, comparing the estimated air flow rate to second and third predetermined air flow limits, and indicating an air leak when the estimated air flow rate is greater than the second predetermined air flow limit and less than the third predetermined air flow limit.

20 Claims, 3 Drawing Sheets

DETECTION OF ENGINE INTAKE MANIFOLD AIR-LEAKS

FIELD

The present disclosure relates to engine air intake system diagnostics, and more specifically to air leak detection in an engine air intake system.

BACKGROUND

The statements in this section merely provide background information related to the present disclosure and may not constitute prior art.

Internal combustion engines combust a fuel and air mixture to produce drive torque. More specifically, air is drawn into the engine through a throttle. The air is mixed with fuel and the mixture is combusted within a cylinder to reciprocally drive a piston within the cylinder, which in turn rotationally drives a crankshaft of the engine.

Engine operation may be regulated based on several parameters including the air flow rate provided to the engine. The air flow provided to the engine may be determined by a mass air flow (MAF) sensor. If an air leak is present at a location downstream of the MAF sensor, the air flow into the engine measured by the MAF sensor may not accurately reflect the actual amount of air provided to the engine.

An inaccurate MAF sensor measurement may result in operation of the engine based on an improper air-fuel ratio. More specifically, when an air leak is present downstream of the MAF sensor, the actual air flow into the engine may be greater than the measured value. As such, an actual air-fuel ratio provided to the engine may be leaner than the commanded air-fuel ratio. The inaccurate MAF sensor measurement may result in poor engine operation including engine stalling.

SUMMARY

A method of determining an engine intake air leak may include measuring an air flow rate into an internal combustion engine, comparing the measured air flow rate to a first predetermined air flow limit, calculating an estimated air flow rate into the engine when the measured air flow rate is less than the first predetermined air flow limit, comparing the estimated air flow rate to second and third predetermined air flow limits, and indicating an air leak when the estimated air flow rate is greater than the second predetermined air flow limit and less than the third predetermined air flow limit.

The method may additionally include controlling an amount of fuel supplied to the engine based on the estimated air flow rate after the air leak is indicated.

A control module may include an air flow measurement module, an air flow calculation module, and an air leak determination module. The air flow measurement module may measure an air flow rate into an internal combustion engine. The air flow calculation module may calculate an estimated air flow rate into the engine. The air leak determination module may be in communication with the air flow measurement module and the air flow calculation module and may determine an air leak condition in an intake system of the engine when the measured air flow rate is less than a first predetermined air flow limit and the estimated air flow rate is greater than a second predetermined air flow limit and less than a third predetermined air flow limit.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
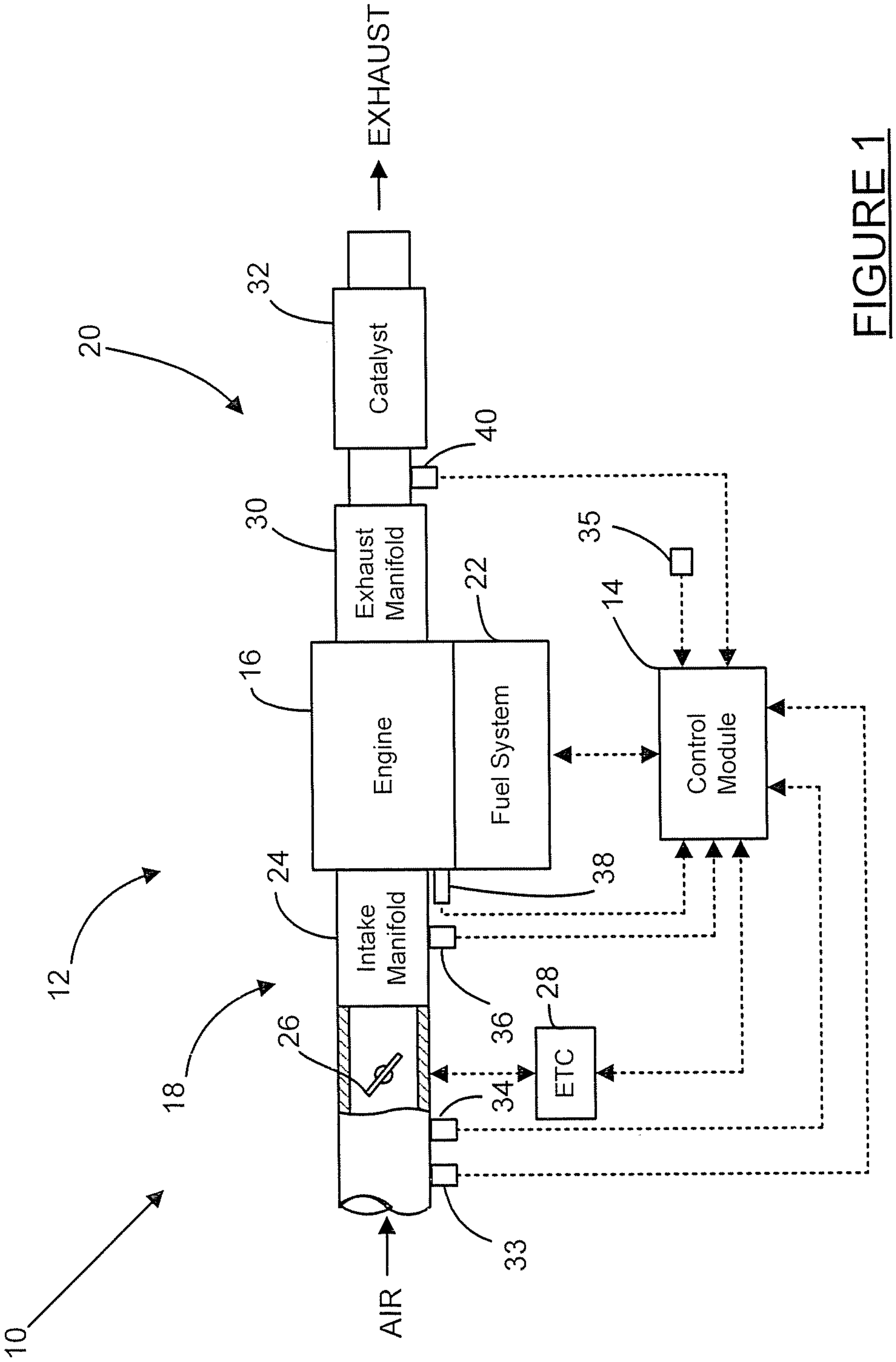
FIG. 1 is a schematic illustration of a vehicle according to the present disclosure.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

Referring to FIG. 1, a vehicle 10 may include an engine assembly 12 and a control module 14. Engine assembly 12 may include an engine 16, an intake system 18, an exhaust system 20, and a fuel system 22. Intake system 18 may be in communication with engine 16 and may include an intake manifold 24, a throttle 26, and an electronic throttle control (ETC) 28. ETC 28 may actuate throttle 26 to control an air flow into engine 16. Exhaust system 20 may be in communication with engine 16 and may include an exhaust manifold 30 and a catalyst 32, such as a catalytic converter. Fuel system 22 may provide fuel to engine 16. Exhaust gas created by combustion of the air-fuel mixture may exit engine 16 through exhaust system 20.

Control module 14 may be in communication with fuel system 22, ETC 28, an intake air temperature (IAT) sensor 33, a mass air flow (MAF) sensor 34, a barometric pressure ($P_{BARO}$) sensor 35, a manifold absolute pressure (MAP) sensor 36, an engine speed sensor 38, and an oxygen sensor 40. IAT sensor 33 may provide a signal to control module 14 indicative of an air temperature within intake system 18. MAF sensor 34 may be located upstream of intake manifold 24 and throttle 26 and may provide a signal to control module 14 indicative of an engine air flow rate ($EFR_{MAF}$) past MAF sensor 34 and into engine 16. MAP sensor 36 may be located downstream of MAF sensor 34, generally between throttle 26 and engine 16 and may provide a signal to control module 14 indicative of MAP within intake manifold 24. Engine speed sensor 38 may provide a signal to control module 14 indicative of the operating speed of engine 16. $P_{BARO}$ sensor 35 may provide a signal to control module 14 indicative of barometric pressure. Oxygen sensor 40 may be located between exhaust manifold 30 and catalyst 32, generally at an inlet of catalyst 32, and may provide a signal to control module 14 indicative of an oxygen level of exhaust gas exiting engine 16.

Figure 2:
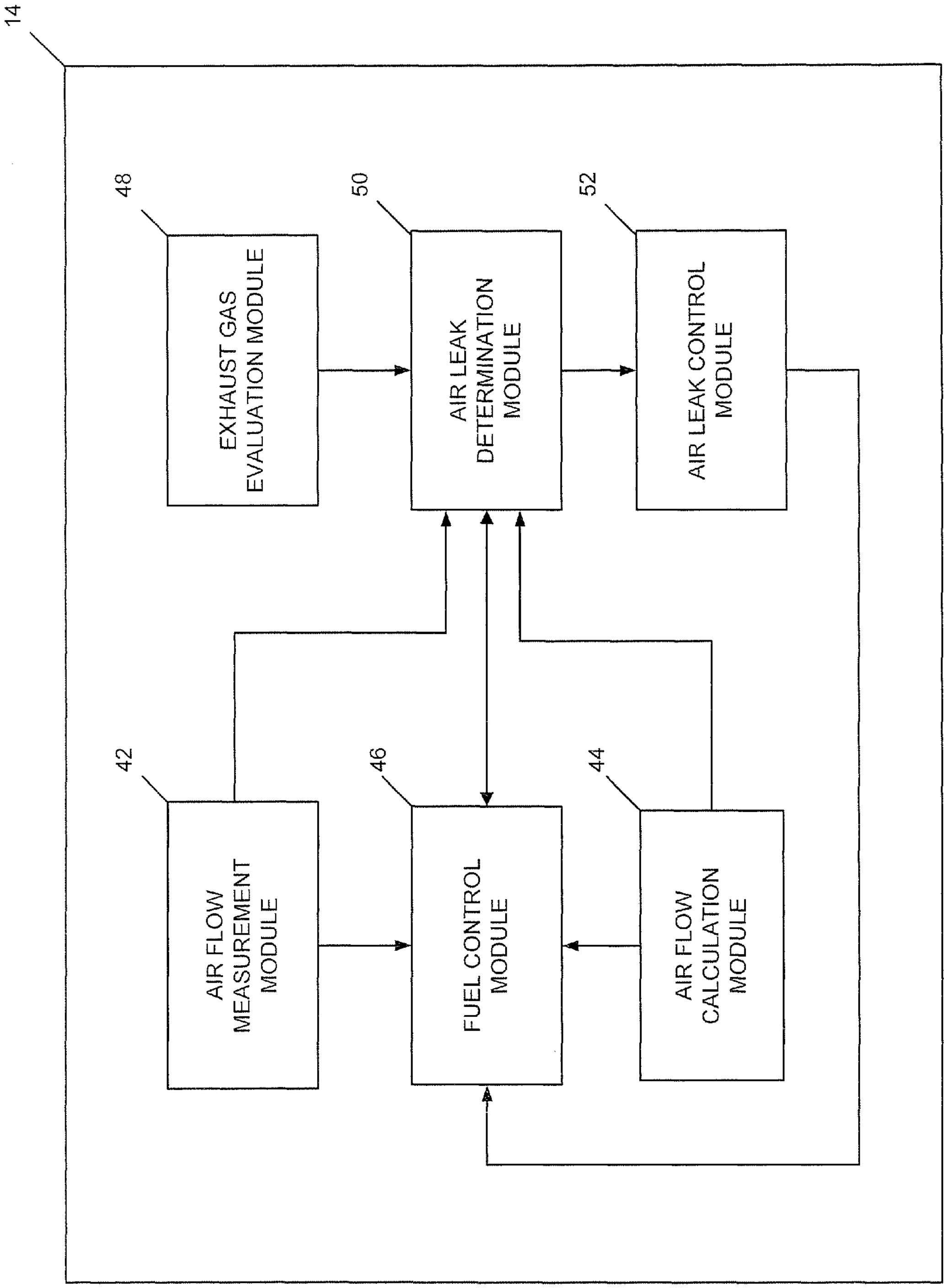
FIG. 2 is a control block diagram of the control module shown in FIG. 1.

Referring to FIG. 2, control module 14 may include an air flow measurement module 42, an air flow calculation module 44, a fuel control module 46, an exhaust gas evaluation module 48, an air leak determination module 50, and an air leak control module 52. Air flow measurement module 42 may receive the air flow measurement signal from MAF sensor 34. Air flow measurement module 42 may be in communication with fuel control module 46 and air leak determination module 50 may provide the engine air flow rate ($EFR_{MAF}$) based on the measurement from MAF sensor 34 thereto.

Air flow calculation module 44 may receive the MAP measurement signal from MAP sensor 36. Air flow calculation module 44 may additionally be in communication with engine speed sensor 38 and may receive the engine speed signal. Air flow calculation module 44 may determine a calculated engine air flow rate ($EFR_{MAP}$) into engine 16 based on the MAP measurement provided by MAP sensor 36 and the engine speed provided by engine speed sensor 38.

More specifically, $EFR_{MAP}$ may be determined by the function shown below:

$$EFR_{MAP}=RPM*MAP*NoCyl*Disp*VE*Bcorr/(120*R*T_m)$$

where RPM is engine speed, MAP is manifold absolute pressure, NoCyl is number of cylinders, Disp is engine displacement, VE is volumetric efficiency (which is a function of RPM and MAP), Bcorr is a barometric correction for VE (which is a function of $P_{BARO}$ and RPM), R is the gas constant for Air (287 $m^2/(s^2{*}°\ K)$), and Tm is manifold air charge temperature. Air flow calculation module 44 may be in communication with fuel control module 46 and air leak determination module 50 and may provide $EFR_{MAP}$ thereto.

Fuel control module 46 may be in communication with fuel system 22 and may determine an amount of fuel needed to meet a desired air-fuel ratio. Fuel control module 46 may receive $EFR_{MAF}$ from air flow measurement module 42 and $EFR_{MAP}$ from air flow calculation module 44. Fuel control module 46 may additionally be in communication with air leak determination module 50 and air leak control module 52.

Exhaust gas evaluation module 48 may be in communication with oxygen sensor 40 and may determine a concentration of oxygen in exhaust gas from engine 16. Exhaust gas evaluation module 48 may be in communication with air leak determination module 50 and may provide the determined oxygen concentration thereto.

Air leak determination module 50 may determine whether an air leak is present in intake system 18 based on inputs from air flow measurement module 42, air flow calculation module 44, fuel control module 46, and exhaust gas evaluation module 48. Air leak determination module 50 may compare $EFR_{MAF}$ and $EFR_{MAP}$ to predetermined limits $LIMIT_{LOW}$ and $LIMIT_{HIGH}$. $LIMIT_{LOW}$ and $LIMIT_{HIGH}$ may be lower and upper calibrated limits for air flow into engine 16, and may be defined as the functions shown below:

$$LIMIT_{LOW}=f1(RPM,IAT,P_{BARO},EngDes); \text{ and}$$

$$LIMIT_{HIGH}=f2(RPM,IAT,P_{BARO},EngDes);$$

where EngDes includes engine stroke, displacement, and valve timing/cam phase.

Air leak control module 52 may be in communication with air leak determination module 50 and may determine remedial actions when an air leak is detected at air leak determination module 50. Air leak control module 52 may additionally be in communication with fuel control module 46 and may adjust fuel supplied to engine 16 when an air leak is detected, as discussed below.

Figure 3:
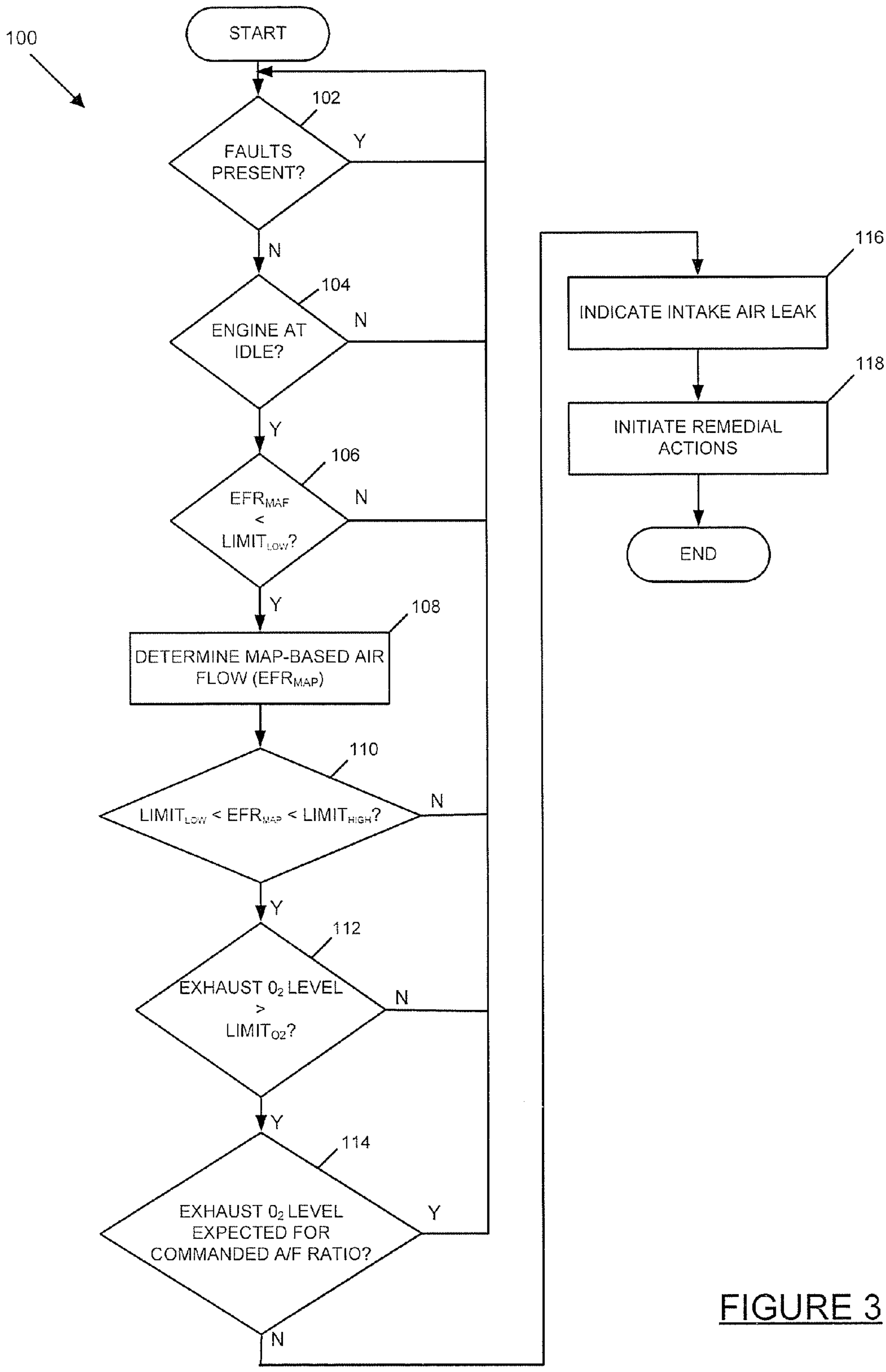
FIG. 3 is a flow diagram illustrating steps for control of the vehicle of FIG. 1.

With reference to FIG. 3, control logic 100 generally illustrates an air leak detection and management system for an air leak in intake system 18. Control logic 100 may begin at block 102 where applicable active diagnostic faults are evaluated. If an active diagnostic fault is present, control logic 100 returns to block 102. Applicable active faults may include faults that will prevent diagnostic systems from making a correct or robust detection. Applicable active faults may include a MAF sensor fault and a MAP sensor fault. It is understood that other fault signals may additionally be considered. If no applicable active faults are detected, control logic 100 may proceed to block 104 where engine idle conditions are evaluated. Vehicle speed and throttle position may be used to make sure that engine 16 is operating at idle. More specifically, a vehicle speed of approximately 0 miles per hour and a closed throttle position may correspond to the idle condition. If idle conditions are met, control logic 100 may proceed to block 106. Otherwise, control logic 100 may return to block 102.

Block 106 may evaluate $EFR_{MAF}$ from MAF sensor 34. If $EFR_{MAF}$ is less than a first predetermined air flow limit, control logic 100 may proceed to block 108. In the present example the first predetermined air flow limit may include $LIMIT_{LOW}$. Otherwise, control logic 100 may return to block 102. Block 108 may determine $EFR_{MAP}$, as discussed above. Control logic 100 may then proceed to block 110 where $EFR_{MAP}$ is evaluated relative to second and third air flow limits.

In the present example, the second air flow limit may include $LIMIT_{LOW}$ and the third air flow limit may include $LIMIT_{HIGH}$. Therefore, the second air flow limit may be equal to the first air flow limit. If $EFR_{MAP}$ is between $LIMIT_{LOW}$ and $LIMIT_{HIGH}$, control logic 100 may proceed to block 112. Otherwise, control logic 100 may return to block 102. Block 112 may evaluate an exhaust oxygen level. If the exhaust oxygen level is greater than a predetermined upper limit ($LIMIT_{O2}$), control logic 100 may proceed to block 114. $LIMIT_{O2}$ may generally correspond to an oxygen level associated with $EFR_{MAF}$ for a generally stoichiometric air-fuel ratio.

When an air leak is present downstream of MAF sensor 34, the amount of fuel provided to engine 16 to maintain a commanded air-fuel ratio may be less than the amount actually needed for the commanded air-fuel ratio due to a greater amount of air entering engine 16 than measured by MAF sensor 34. More specifically, the greater amount of air may result in a lean air-fuel ratio (greater than 14.7-to-1) when the commanded air fuel ratio is stoichiometric, resulting in a greater exhaust oxygen level than would be present from a generally stoichiometric air-fuel ratio.

Block 114 may evaluate exhaust oxygen levels relative to the commanded air-fuel ratio from fuel control module 46. The commanded air-fuel ratio may include a stoichiometric air-fuel ratio (14.7-to-1) or a rich air-fuel ratio (less than 14.7-to-1). More specifically, block 114 may generally determine whether the high oxygen level in the exhaust gas is due to the commanded air-fuel ratio. The evaluation at block 114 may include a comparison between an expected exhaust gas oxygen level associated with the commanded air-fuel ratio and the measured exhaust oxygen level. If the oxygen level corresponds to the commanded air-fuel ratio, control logic 100 may return to block 102. Otherwise, control logic 100 may proceed to block 116.

For example, if the commanded air-fuel ratio is rich (less than 14.7-to-1), a relatively low oxygen level would be expected in the exhaust gas. Therefore, the high oxygen level would generally indicate an air leak. However, if the commanded air-fuel ratio is lean, the high exhaust oxygen level may be due to the commanded air-fuel ratio and not an air leak.

Block 116 may generally indicate an air leak in intake system 18. Control logic 100 may then proceed to block 118 where remedial actions may be initiated. Remedial actions may include controlling fuel supplied to engine 16 based on $EFR_{MAP}$ rather than $EFR_{MAF}$. Control logic 100 may then terminate.

What is claimed is:

1. A method comprising:

measuring an air flow rate into an internal combustion engine;

comparing said measured air flow rate to a first predetermined air flow limit;

calculating an estimated air flow rate into said engine when said measured air flow rate is less than said first predetermined air flow limit;

comparing said estimated air flow rate to second and third predetermined air flow limits; and indicating an air leak when said estimated air flow rate is greater than said second predetermined air flow limit, and less than said third predetermined air flow limit.

2. The method of claim 1, further comprising determining an oxygen level of an exhaust gas exiting said engine and indicating an air leak when said oxygen level is greater than a predetermined oxygen level limit.

3. The method of claim 2, wherein said determining occurs after said comparing said estimated air flow rate.

4. The method of claim 2, further comprising determining a commanded air-fuel ratio based on said measured air flow rate and providing an amount of fuel to said engine based on said air-fuel ratio, said indicating occurring when an oxygen level of said exhaust gas is greater than an expected oxygen level associated with said air-fuel ratio.

5. The method of claim 4, wherein said air-fuel ratio is less than 14.7-to-1.

6. The method of claim 1, further comprising controlling an amount of fuel supplied to said engine based on said estimated air flow rate after said air leak is indicated.

7. The method of claim 1, wherein, said comparing said measured air flow rate occurs when said engine is operating at an idle condition.

8. The method of claim 1, wherein said first predetermined air flow limit is generally less than said third predetermined air flow limit.

9. The method of claim 8, wherein said first predetermined air flow limit is generally equal to said second predetermined air flow limit.

10. The method of claim 1, wherein said estimated air flow rate is calculated based on an air pressure measurement within an intake system of said engine.

11. A method comprising:

measuring an air flow rate into an internal combustion engine;

comparing said measured air flow rate to a first predetermined air flow limit;

calculating an estimated air flow rate into said engine when said measured air flow rate is less than said first predetermined air flow limit;

comparing said estimated air flow rate to second and third predetermined air flow limits; and controlling an amount of fuel supplied to said engine based on said estimated air flow rate when said estimated air flow rate is greater than said second predetermined air flow limit and less than said third predetermined air flow limit.

12. The method of claim 11, further comprising indicating an air leak when said estimated air flow rate is greater than said second predetermined air flow limit and less than said third predetermined air flow limit.

13. The method of claim 11, further comprising determining an oxygen level of an exhaust gas exiting said engine and controlling an amount of fuel supplied to said engine based on said estimated air flow rate when said oxygen level is greater than a predetermined oxygen level limit.

14. The method of claim 13, further comprising indicating an air leak when said oxygen level is greater than said predetermined oxygen level limit.

15. The method of claim 13, further comprising determining a commanded air-fuel ratio based on said measured air flow rate and providing an amount of fuel to said engine based on said air-fuel ratio, said controlling occurring when said oxygen level is greater than an oxygen level associated with said air-fuel ratio.

16. A control module comprising:

an air flow measurement module that measures an air flow rate into an internal combustion engine;

an air flow calculation module that calculates an estimated air flow rate into said engine; and an air leak determination module in communication with said air flow measurement module and said air flow calculation module that determines an air leak condition in an intake system of said engine when said measured air flow rate is less than a first predetermined air flow limit and said estimated air flow rate is greater than a second predetermined air flow limit and less than a third predetermined air flow limit.

17. The control module of claim 16, further comprising an exhaust gas evaluation module in communication with said air leak determination module that determines an oxygen level of an exhaust gas exiting said engine, said air leak determination module indicating an air leak when said oxygen level is greater than a predetermined oxygen level limit.

18. The control module of claim 17, further comprising a fuel control module in communication with said air flow calculation module and said an air leak determination module that controls a commanded air-fuel ratio provided to said engine based on said estimated air flow rate after said air leak condition is determined.

19. The control module of claim 17, further comprising a fuel control module in communication with said air flow measurement module and said air leak determination module that controls a commanded air-fuel ratio provided to said engine based on said measured air flow rate, said air leak determination module determining said air leak condition when an oxygen level of an exhaust gas from said engine is greater than an oxygen level associated with said air-fuel ratio.

20. The control module of claim 16, wherein said estimated air flow rate is calculated based on an air pressure measurement within an intake system of said engine.

* * * * *